United States Patent [19]

Berger et al.

[11] Patent Number: 5,343,293
[45] Date of Patent: Aug. 30, 1994

[54] ELLIPSOMETER

[75] Inventors: Rudolf Berger, Marloffstein; Heiner Ryssel, Spordorf; Claus Schneider, Möhrendorf; Wolfgang Aderhold, Nürnberg, all of Fed. Rep. of Germany

[73] Assignee: Fraunhofer-Gesellschaft zur Forderung der angewandten, Munich, Fed. Rep. of Germany

[21] Appl. No.: 940,903

[22] PCT Filed: Apr. 24, 1991

[86] PCT No.: PCT/DE91/00345
§ 371 Date: Oct. 23, 1992
§ 102(e) Date: Oct. 23, 1992

[87] PCT Pub. No.: WO91/16600
PCT Pub. Date: Oct. 31, 1991

[30] Foreign Appliation Priority Data

Apr. 25, 1990 [DE] Fed. Rep. of Germany ..... 4013211

[51] Int. Cl.$^5$ ............................................. G01B 11/00
[52] U.S. Cl. ..................................... 356/369; 356/382
[58] Field of Search ....................... 356/369, 381, 382

[56] References Cited

U.S. PATENT DOCUMENTS 3,060,793 10/1962 Wells ..................................... 88/14
3,737,237 6/1973 Zurasky ............................. 356/382

FOREIGN PATENT DOCUMENTS 102470 3/1987 European Pat. Off. .
296680 12/1988 European Pat. Off. .
2417548 10/1974 Fed. Rep. of Germany .

Primary Examiner—Richard A. Rosenberger
Attorney, Agent, or Firm—Wolf, Greenfield & Sacks

[57] ABSTRACT

An ellipsometer, used in particular for measuring the thickness of oxide films on silicon wafers inside an oven, comprising an analyzer unit (3), a beam deflection device, a paddle and a ploarizer unit (2). In order to increase the measurement precision, the ellipsometer is designed so that the beam deflection device comprises two prisms (6, 9), the prisms (6,9), the analyzer unit (3) and the polarizer unit (2) are mounted on the paddle (11), and two tubes (4, 10) are provided for guiding the beam from the polarizer unit (2) to the first prism (6) and from the second prism (9) to the analyzer unit (3).

13 Claims, 4 Drawing Sheets

ELLIPSOMETER

DESCRIPTION

The present invention refers to an ellipsometer used for in-situ measuring of the film thickness of films applied to or deposited on an object within an oven, comprising an analyzer unit, a beam deflection device, a paddle having the object arranged thereon, and a polarizer unit.

The present invention deals, in particular, with an ellipsometer, which is adapted to be used in the field of silicon semiconductor technology for controlling within conventional oxidation ovens, CVD (chemical vapour deposition) ovens or CVD reactors the grown oxidation film thickness or CVD film thickness on silicon wafers in situ.

Ellipsometers used for film thickness measurement have been known for decades with respect to their measurement principle as well as with respect to their structure, this being proved by the following technical publications:

Y. J. van der Meulen, N. C. Hien, "Design and operation of an automated, high temperature ellipsometer" J. Opt. Soc. Am. 64, 1974.

R. H. Muller, "Principles of Ellipsometry" Advances in Electrochemistry and Electrochemical Engineering, vol. 9, Wiley, N.Y. 1973.

It is also known to use ellipsometers for measuring the grown oxide film thickness on silicon wafers in oxidation ovens, as will be evident from the first-mentioned technical publication. In these cases, the geometry of the oxidation oven is normally adapted to the structure of the ellipsometer. In so doing, the heating cartridge of the oxidation oven is provided with beam passages, and this may cause disturbances within the temperature profile in the oxidation oven. Furthermore, a pipe connection to the quartz tube of the oxidation oven with beam passage windows is required, and this will cause tensions in the quartz tube. This pipe connection cannot be produced such that it is gastight so that an ingress of external air from the heating cartridge into the process tube may occur. Moreover, in the case of the known ellipsometer, it is necessary that the adjustment of said ellipsometer to the silicon wafer film thickness to be measured is carried out at a high temperature, without the opeator being able to observe the ray path. Taking into account the overall structure of the ellipsometer and of the oxidation oven, it will be evident that, by means of the known ellipsometer, a film thickness measurement can only be carried out at one single location on the semiconductor wafer. Furthermore, in practical operation, it turns out to be unacceptable that, in the case of the known ellipsometer, the polarizer unit and the analyzer unit are located on opposite sides of the heating cartridge of the oxidation oven in the so-called grey room.

An ellipsometer according to the generic clause, used for in-situ measurement of the film thickness of films applied to or deposited on semiconductor wafers within an oven, is known from EP-B1-102470. In the case of this known ellipsometer system, the analyzer unit and the polarizer unit are arranged such that the light beam emitted by the polarizer unit is parallel to the light beam received by the analyzer unit, said light beams extending parallel to the axis of symmetry of the quartz tube of the oxidation oven. The light beam emitted by the polarizer unit is deflected on the surface of a first silicon wafer, which is arranged approximately at an angle of 45° to the longitudinal axis of the quartz tube, and falls on a second silicon wafer, which is arranged symmetrically to the first silicon wafer and by means of which the light beam is reflected towards the analyzer unit. It follows that this ellipsometer system can only be used for simultaneously measuring oxidation films deposited on two silicon wafers. Furthermore, it turned out that the measuring signal produced in the case of such an ellipsometer system is a temporally strongly fluctuating measuring signal so that, for reasons of measurement precision, this arrangement has not spread widely. In addition, this ellipsometer arrangement requires an adjustment of the polarizer unit and of the analyzer unit, when the oxidation oven has been charged with a set of silicon wafers.

German-Offenlegungsschrift 24 17 548 shows an ellipsometer for measuring the film thickness of layers applied to or deposited on an object within an oven, comprising an analyzer unit, a beam deflection device, and a polarizer unit, said beam deflection device including a first prism arranged in the ray path in front of said object and a second prism arranged in the ray path behind said object. This known ellipsometer can only be used under laboratory conditions and is not suitable for in-situ measurements, since the phase shift in the prisms will change in response to temperature variations. Details of the structural design of this ellipsometer cannot be inferred from this publication.

In comparison with the above-discussed prior art, the present invention is based on the task of further developing an ellipsometer of the type mentioned at the beginning in such a way that, on the basis of easy handling, a temporally stable measuring signal will be obtained by means of said ellipsometer, said temporally stable measuring signal showing low measurement noise even at high temperatures and permitting high measurement constancy in film thickness determination during independent, separate process sequences.

This task is solved by an ellipsometer wherein the beam deflection device comprises a first prism wherein the beam deflection device comprises a first prism arranged in the ray path in front of the object on which a film is deposited, and a second prism arranged in the reflected ray path from behind the object. The prisms, analyzer unit and polarizer unit are arranged on a paddle which also has arranged thereon the object. A first tube is provided, extending between the first prism the polarizer unit. A second tube is provided, extending between the second prism and the analyzer unit.

The present invention is based on the finding that reproducable measurement results for different process sequences as well as the avoidance of any contamination of the objects to be measured can only be achieved on the basis of a deviation from the ellipsometer arrangement which has been described at the beginning and which necessitates the use of pipe connections to the quartz tube of the oxdiation oven. The present invention provides in this respect the features that the polarizer unit, the analyzer unit, the object and the beam deflection device are secured in position relative to the paddle. Furthermore, the present invention is based on the finding that ellipsometer measuring systems of the type disclosed in the last-discussed prior art have a lower measurement precision not least in view of the fact that, in the case of these ellipsometer measuring systems, the beam emitted by the polarizer unit as well as the beam received by the analyzer unit pass, in the vicinity of an oven closure plate, through rapidly flowing areas of the process gas, which will cause a temporally fluctuating or jittering measurement result in the case of the measuring arrangement according to the prior art. Due to the tubes through which the abovementioned light beams are guided, these problems cannot arise in the case of the ellipsometer according to the present invention. The ellipsometer according to the present invention has thus a high temporal measurement constancy in spite of the fact that the beams are guided over long distances with high temperature gradients. Furthermore, the fact that, in the case of the ellipsometer according to the present invention, beam deflection is effected with the the aid of two prisms, which are also secured in position relative to the paddle, will guarantee a simple overall structure in combination with a high reproducability of the measurement results from one process sequence to the next.

Preferred further developments of the ellipsometer according to the present invention are disclosed in the subclaims.

In the following, a preferred embodiment of the ellipsometer according to the present invention will be explained in detail with reference to the drawings enclosed, in which FIG. 1 shows a schematic top view representation of an embodiment of the ellipsometer according to the present invention;

Figure 1:
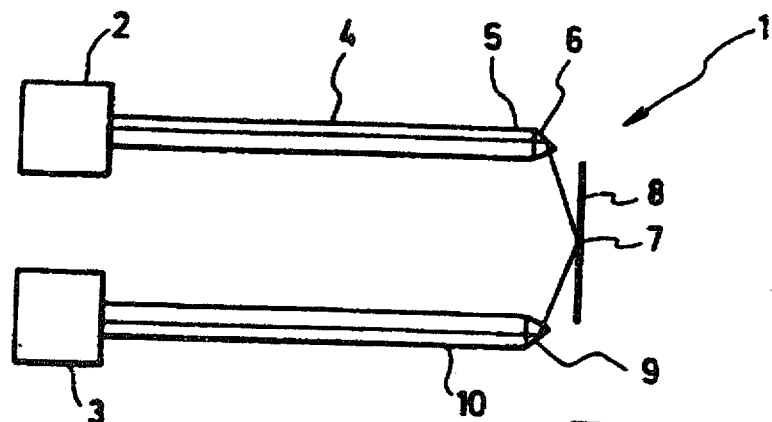

As can be seen in FIG. 1, the ellipsometer, which is provided with reference numeral 1 in its entirety, comprises a polarizer unit 2, which emits a polarized light beam, as well as an analyzer unit 3.

Figure 6:
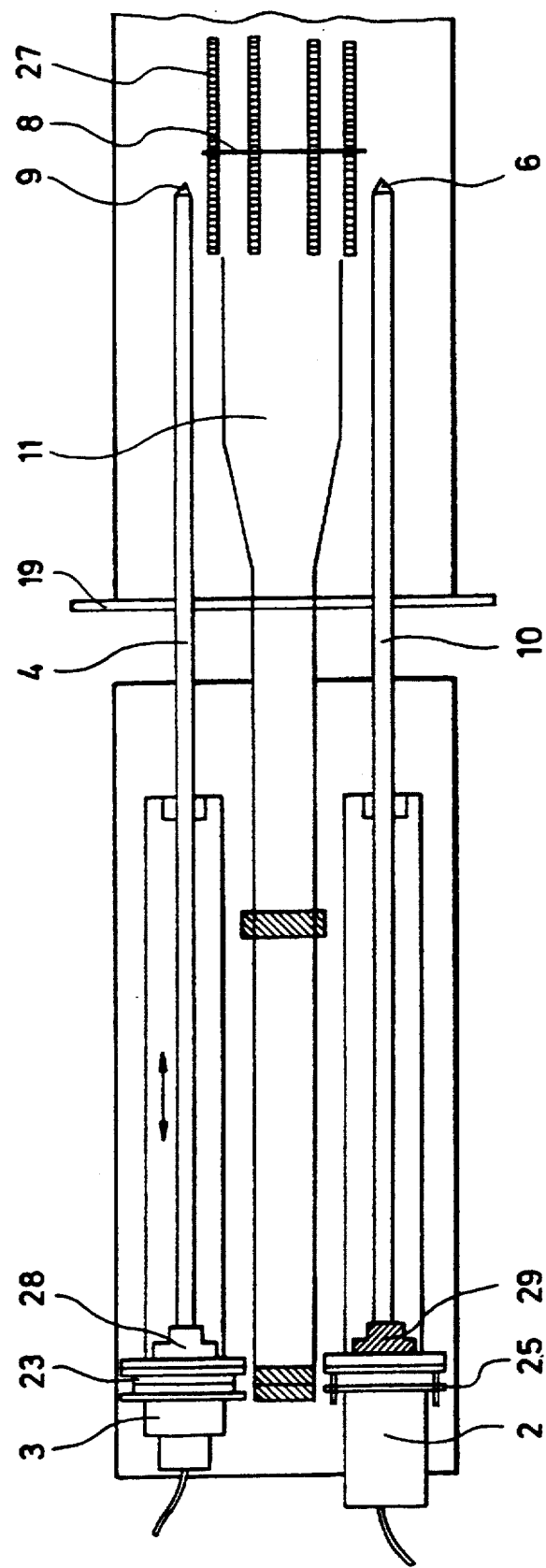
FIG. 6 shows a detailed representation of the overall arrangement of the ellipsometer according to the present invention.

The polarized light beam emitted by the polarizer unit 2 passes through a first tube 4, which, at its end 5 facing away from the polarizer unit 2, has secured thereto a first prism 6 through which the light beam falls on a measuring place 7 on a silicon wafer 8. At the measuring place 7, which can, for example, be an oxide film area of the silicon wafer 8 which is to be measured with respect to its film thickness, the polarized light will be reflected, whereupon it will fall on a second prism 9, which is secured to a second tube 10. When the light beam has been deflected by the second prism 9 and when it has passed through the second tube 10, the light will be received by the analyzer unit 3. As will still be explained hereinbelow with reference to FIG. 6, the polarizer unit 2 and the analyzer unit 3 are, just as the silicon wafer 8, secured to the paddle 11 (FIG. 6). The tubes 4, 10 are, in turn, secured to the polarizer unit 2 and to the analyzer unit 3, respectively, so that also the prisms 6, 9 are secured in position relative to the paddle 11 via the tubes 4, 10 and the polarizer unit 2 or the analyzer unit 3.

The tubes 4, 10 are fused silica tubes whose internal walls are roughened by sandblasting. On the basis of this structural design of the tubes, a possible misalignment of said tubes 4, 10 will be easy to recognize, since the operator would discern a light spot, if the light beam fell on the roughened internal wall.

Figure 2:
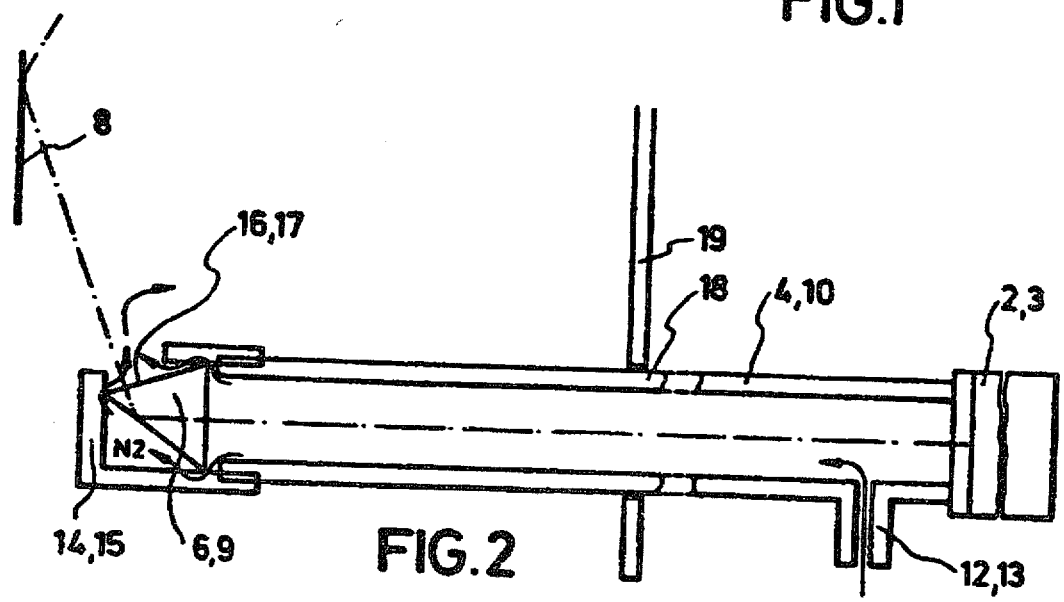
FIG. 2 shows a sectional view through part of the embodiment of the ellipsometer according to FIG. 1.

As can be seen in FIG. 2, each of the tubes 4, 10 has, at its end facing the polarizer unit 2 or the analyzer unit 3, a gas feed pipe 12, 13 through which nitrogen is fed to the pipes 4, 10. In the area of the prisms 6, 9, the tubes 4, 10 are followed by gas guiding devices 14, 15, which guide the nitrogen flowing out of the tube ends in the area of the prisms 6, 9 in such a way that it will form a nitrogen curtain in front of the prism faces 16, 17 defining part of the prisms 6, 9 and facing the silicon wafer 8. Such a nitrogen curtain will prevent said prism faces 16, 17 from being contaminated, when the ellipsometer is used in connection with chemical vapour deposition processes.

As can additionally be seen from FIG. 2, the tubes 4, 10 each extend from the polarizer unit 2 and the analyzer unit 3, respectively, into the interior 20 of the oven (not shown) through openings 18 in the closure plate 19.

As will be explained in detail hereinbelow with reference to FIG. 6, the polarizer unit and the analyzer unit are arranged such that they are adapted to be displaced in the direction of the longitudinal axis of the tubes 4, 10 relative to the paddle 11 (FIG. 6).

Figure 3:
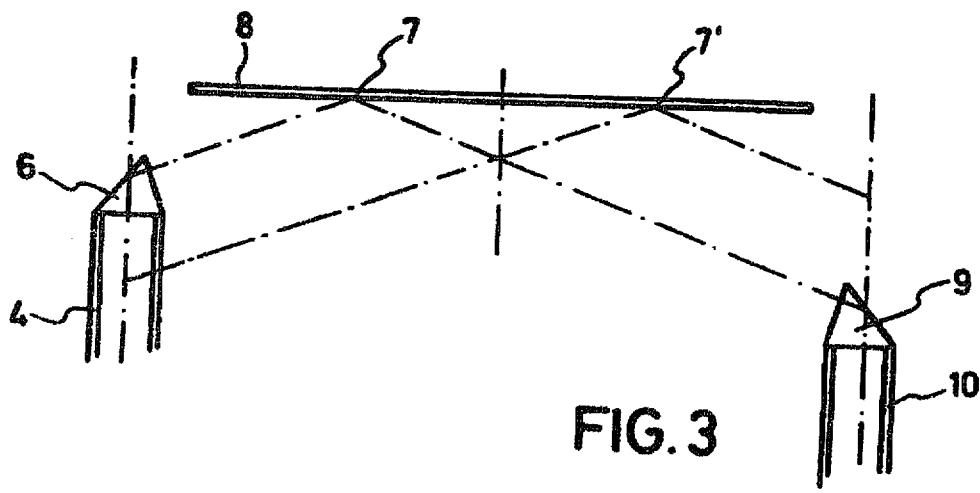
FIG. 3 shows a schematic representation for explaining the measuring place displacement in the case of this embodiment of the ellipsometer according to the present invention.

Due to the longitudinal displaceability of the polarizer unit 2 together with the first tube 4 and the first prism 6 and of the analyzer unit 3 together with the second tube 10 and the second prism 9, it will be possible to vary the measuring place 7, 7' with respect to the silicon wafer 8 in a direction transverse to the longitudinal axis of the tubes 4, 10, as can be seen from FIG. 3 for two different longitudinal adjustments.

Figure 4:
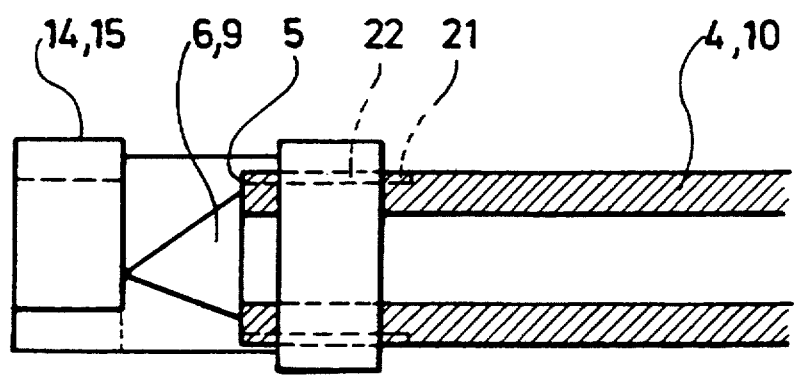
FIG. 4 shows a top view of the arrangement of a prism in the case of the embodiment of the ellipsometer according to the present invention.
Figure 5:
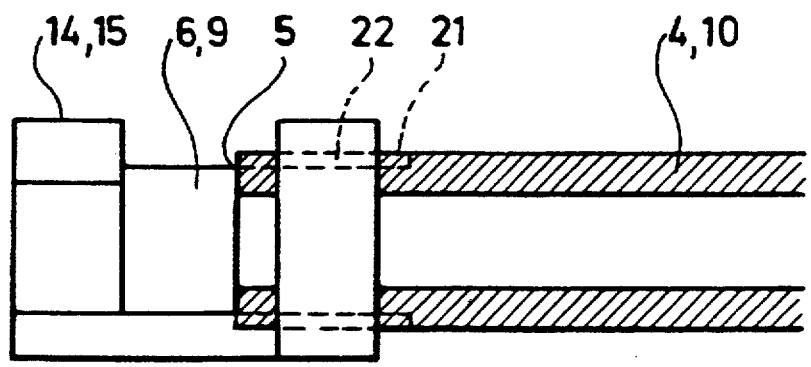
FIG. 5 shows a side view of the arrangement of the prism according to FIG. 4.

As will especially be evident in FIG. 4 and 5, the tubes 4, 10 are, on their end located on the side of the prism, provided with an external quartz thread 21, which is engaged by a complementary counterthread 22 of the gas guiding device 14, 15. The front end 5 of the tubes 4, 10, which faces the prism 6, 9, has been subjected to facing and serves as an attachement surface for the prism 6, 9.

As can be seen in FIG. 6, the analyzer unit 3 is connected to a base plate via a first X-Y table 23, said base plate having attached thereto the polarizer unit 2 via an angular adjustment table 25. The base plate 24, in turn, is connected to the paddle 11, which can, for example, be a SiC paddle. The paddle 11 has attached thereto a boat 27 for receiving silicon wafers 8. As has already been explained, the tubes 4, 10 each extend from the analyzer unit 3 and the polarizer unit 2, respectively, to the prisms 6, 9.

By means of first and second pivot bearing devices 28, 29, the tubes 4, 10 are supported such that they are adapted to be rotated about their longitudinal axis.

Figure 7:
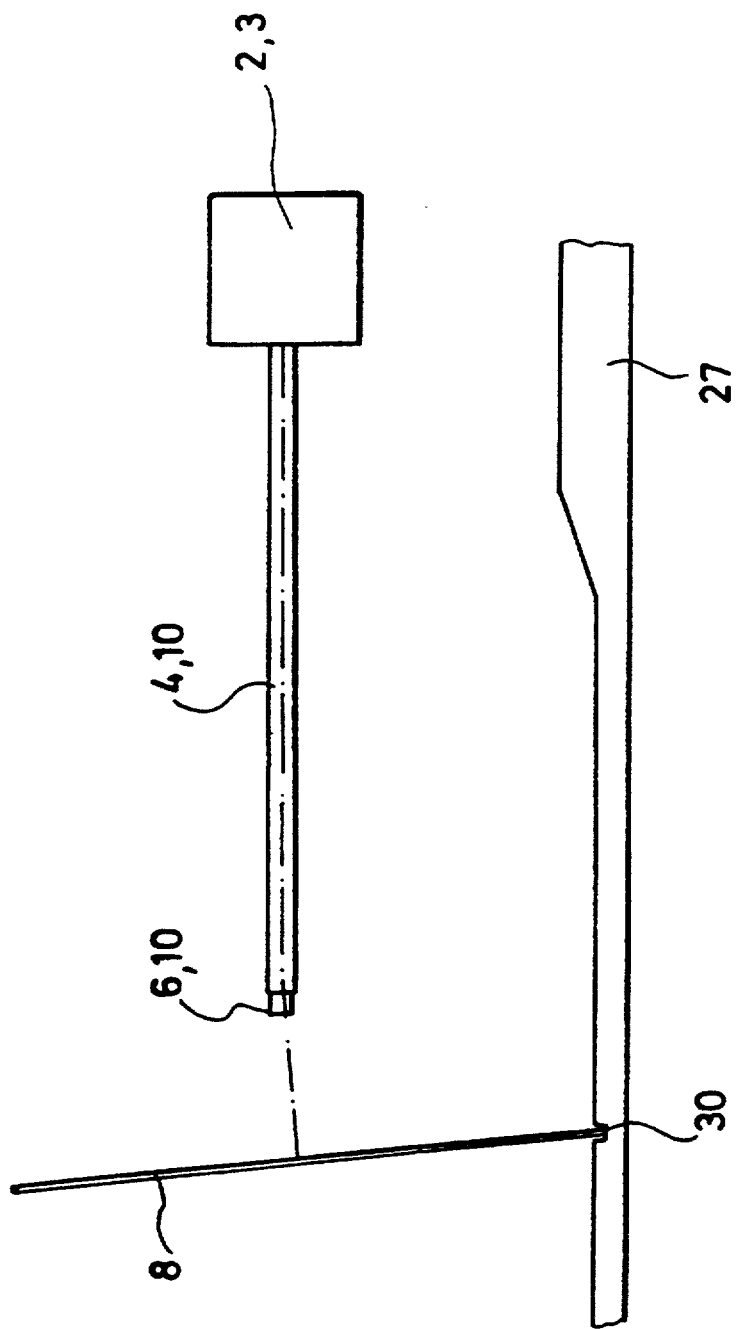
FIG. 7 shows a side view of the embodiment of the ellipsometer according to the present invention.

As can be seen from FIG. 7, the boat 27 can be provided with recesses 30 used for holding the silicon wafers 8 and having a structural design of such a nature that said silicon wafers 8 will be held at an angle relative to the vertical. By adequately rotating the tubes 4, 10 about their longitudial axes, the beam can be guided such that the beam plane of the beams extending between the prisms 6, 9 and the silicon wafer 8 will extend at right angles to the oblique silicon wafer 8.

Due to the displaceability of the measuring place in the longitudinal direction and in the transverse direction in the case of the ellipsometer system according to the present invention, all the silicon wafers which were jointly treated in one process can be measured one after the other. For this purpose, the respective last wafer which has been measured is discharged, whereupon the measuring arrangement will move to the next wafer. A contamination of the wafers, which may occur in cases in which a separate film thickness measuring station is used, will thus be avoided.

A single point measurement as well as a line measurement can be carried out in the case of all the wafers.

In the case of the ellipsometer according to the present invention, prisms consisting of synthetic fused silica with a 70° beam deflection can be used, said prims having a 55° angle of incidence within the prism. The phase shift caused by the total internal reflection in such prisms amounts to 84° and, consequently, it approaches the value of 90° very closely so that the use of quarter-wave plates for the measurement of thin oxide films, which is necessary in the case of the ellipsometers according to the prior art, can be dispensed with in the case of the ellipsometer according to the present invention. When prisms having a 55° angle of incidence are used, a relative insensitivity to the actual angle of incidence will be obtained so that minor faults in the adjustment of the laser beam to the prisms will only result in insignificant phase shifts.

To the person skilled in the art it will be obvious that, in contrast to the ellipsometers according to the prior art described first in the present application, the ellipsometer according to the present invention can be operated from the clean room. Hence, every type of operation of the ellipsometer according to the present invention can be carried out by an operator in the clean room, without there being any necessity of entering the grey room for the purpose of operation.

The ellipsometer according to the present invention can be constructed such that all the components positioned within the process tube consist of fused silica. Contamination of the process tube will thus be excluded.

We claim:

1. An ellipsometer used for in-situ measurement of the film thickness of films applied to or deposited on an object within an oven, comprising:
    an analyzer unit;
    a beam deflection device;
    a paddle having arranged thereon the object;
    the beam deflection device including a first prism arranged in front of said object to deflect an incident beam from the polarizer unit to said object and a second prism arranged in front of said object, to deflect to the analyzer unit a beam reflected from said object;
    the prisms, the analyzer unit and the polarizer unit being arranged on the paddle;
    a first tube extending from said polarizer unit toward, and holding, said first prism;
    a second tube extending from said analyzer unit toward, and holding, said second prism.

2. An ellipsometer according to claim 1 wherein both tubes are secured to the paddle, and each of said tubes is connected to one of said prisms so that the prisms are fixedly connected to the paddle by means of said tubes.

3. An ellipsometer according to claim 1, wherein the tubes consist of fused silica and are provided with rough internal walls.

4. An ellipsometer according to claim 1, wherein the prisms abut on the end faces of the tubes.

5. An ellipsometer according to claim 1, wherein each of the tubes is connected to a gas feeding device and, at its end facing the prism to gas guiding device and the gas guiding device is constructed such that it will form a gas curtain in front of the prism face facing the object.

6. An ellipsometer according to claim 5 wherein the gas supplied to the tubes is nitrogen.

7. An ellipsometer according to claim 5, wherein each tube is provided with a thread at its end facing the prism.

8. An ellipsometer according to claim 7, wherein the prism is provided with a counterthread adapted to the thread of the tube.

9. An ellipsometer accoridng to claim 5, wherein the gas guiding device holds the prism and is provided with a counter-thread adapted to the thread of the tube.

10. An ellipsometer according to claim 1, wherein the prisms are arranged such that the angle of incidence of the beam is between 50° and 60°.

11. An ellipsometer according to claim 10, wherein the angel of incidence of the beam is 55°.

12. An ellipsometer according to claim 1, wherein the analyzer unit as well as the polarizer unit are connected to the paddle by means of an adjustable linear guiding device for linearly displacing said analyzer and ploarizer units.

13. An ellipsometer according to claim 1, wherein the tubes are arranged such that they are adapted to be rotated about their longitudinal axes, and the objects are secured in position relative to the paddle such that their surface provided with the films to be measured extends at an acute angle to the vertical.

* * * * *